(12) United States Patent
Kromminga et al.

(10) Patent No.: US 8,016,044 B2
(45) Date of Patent: Sep. 13, 2011

(54) SOIL SHAPING AGRICULTURAL IMPLEMENT

(75) Inventors: Gaylen J. Kromminga, Morton, IL (US); Timothy R. Blunier, Danvers, IL (US); Michael C. Hatton, Washington, IL (US); Scott Faust, Philo, IL (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/608,598

(22) Filed: Oct. 29, 2009

(65) Prior Publication Data

US 2011/0100653 A1 May 5, 2011

(51) Int. Cl.
*A01B 5/00* (2006.01)

(52) U.S. Cl. ........ 172/178; 172/133; 172/176; 172/196; 172/582

(58) Field of Classification Search ............ 172/133, 172/142–157, 174, 175, 178, 180, 196, 582, 172/587, 176

See application file for complete search history.

(56) References Cited

U.S. PATENT DOCUMENTS

| | | | |
|---|---|---|---|
| 2,420,973 A | 5/1947 | Petersen | |
| 4,454,920 A | 6/1984 | Dietrich, Sr. | |
| 4,682,658 A * | 7/1987 | Erickson | 172/73 |
| 4,762,181 A * | 8/1988 | Cox | 172/196 |
| 4,779,684 A | 10/1988 | Schultz | |
| 5,080,178 A | 1/1992 | Dietrich, Sr. | |
| 5,458,203 A | 10/1995 | Evers | |
| 5,878,821 A | 3/1999 | Flenker et al. | |
| 6,119,791 A | 9/2000 | Mansur | |
| 6,276,462 B1 | 8/2001 | Dietrich, Sr. | |
| 6,612,381 B2 * | 9/2003 | Powell et al. | 172/586 |
| 7,000,708 B2 * | 2/2006 | Powell et al. | 172/600 |
| 2004/0144550 A1 * | 7/2004 | Hurtis | 172/147 |
| 2006/0021768 A1 | 2/2006 | Ankenman | |

FOREIGN PATENT DOCUMENTS

| | | |
|---|---|---|
| EP | 1310144 | 5/2003 |
| GB | 2184332 | 6/1987 |

\* cited by examiner

*Primary Examiner* — Robert Pezzuto
*Assistant Examiner* — Matthew Troutman
(74) *Attorney, Agent, or Firm* — Rebecca Henkel; Sue Watson

(57) ABSTRACT

In an embodiment, an agricultural implement includes at least a first row of ground engaging tools, each of the tools spaced a first distance apart from one another, and a second row of ground engaging tools disposed behind the first row of ground engaging tools, each of the second row of ground engaging tools spaced a second distance apart from one another. The implement also includes a row of soil shaping disks disposed behind the second row of ground engaging tools, wherein a spacing between each of the soil shaping disks is not uniform and corresponds to whether the spacing is behind the first row of ground engaging disks or behind the second row of ground engaging disks.

7 Claims, 3 Drawing Sheets

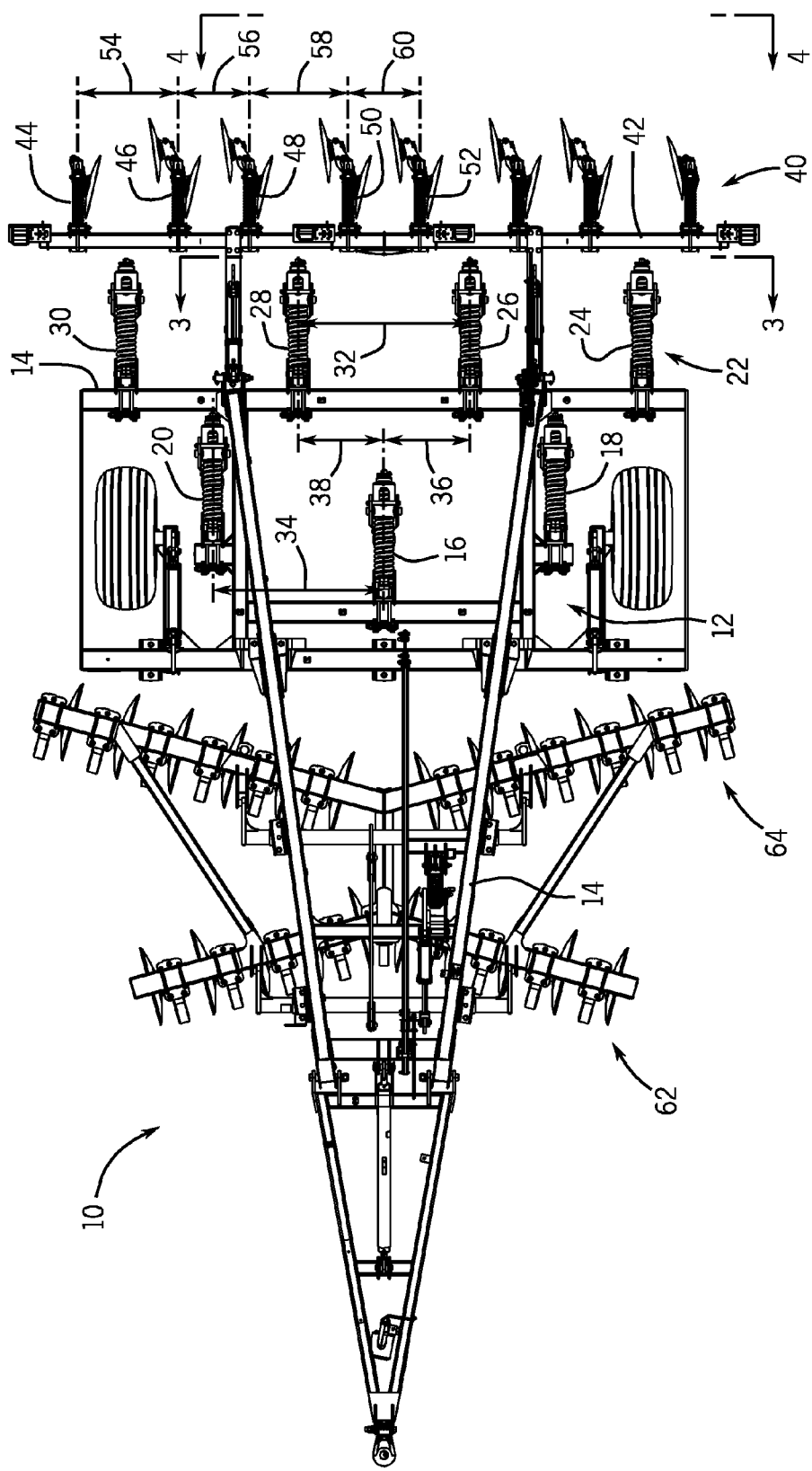

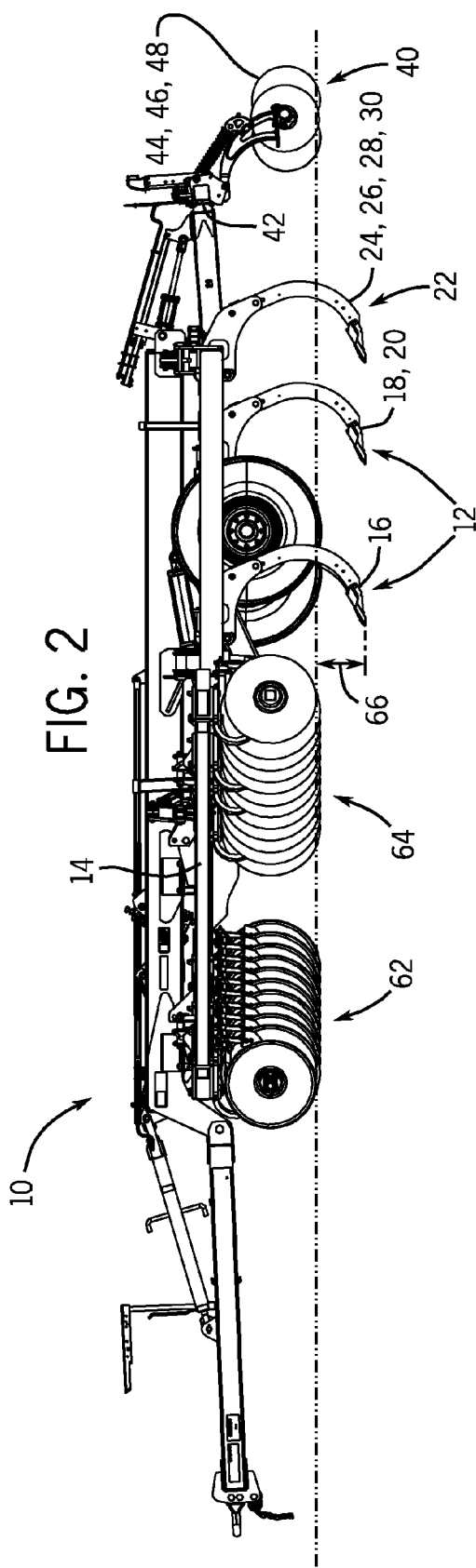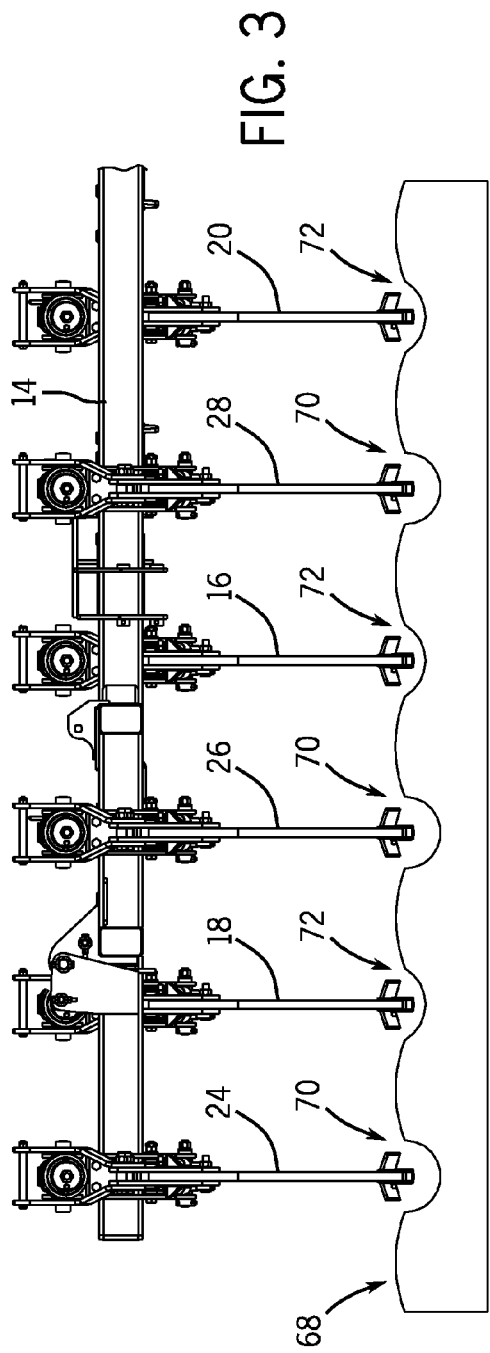

US 8,016,044 B2

SOIL SHAPING AGRICULTURAL IMPLEMENT

BACKGROUND

The present invention relates generally to the field of agricultural tillage implements, such as chisels, cultivators, and rippers towed behind a work vehicle, such as a tractor.

A wide range of agricultural implements have been developed and are presently in use for tilling, cultivating, harvesting, and so forth. Tillage implements, for example, are commonly towed behind tractors and may cover wide swaths of ground which may include soil residue. Soil residue may include materials left in an agricultural field or after the crop has been harvested. These residues typically include stalks and stubble, leaves and seed pods. Good management of field residues can increase efficiency of irrigation and control of erosion in the field.

Accordingly, chisels may include ground engaging tools, such as shanks and plows, configured to condition the soil to reduce soil compaction while improving moisture distribution. In some implements, the ground engaging tools may suffer from a buildup of residue on and around the ground engaging tools. This reduces the performance of the implement and may adversely affect the condition of the soil. Positioning the ground engaging tools further apart may reduce the accumulation of soil residue, but may also adversely affect the implement's ability to condition soil. For example, when the tools are spaced from one another a greater distance, large valleys or grooves may be formed in the soil due to the inability of the tools to access intermediate regions between the tools (e.g., to throw soil into such regions). Large valleys in the soil may reduce even moisture distribution and may increase work needed for preparation of soil for seeding.

BRIEF DESCRIPTION

In accordance with certain aspects of the present techniques, an agricultural implement includes at least a first row of ground engaging tools, each of the tools spaced a first distance apart from one another, and a second row of ground engaging tools disposed behind the first row of ground engaging tools, each of the second row of ground engaging tools spaced a second distance apart from one another. The implement also includes a row of soil shaping disks disposed behind the second row of ground engaging tools, wherein a spacing between each of the soil shaping disks is not uniform and corresponds to whether the spacing is behind the first row of ground engaging disks or behind the second row of ground engaging disks.

DRAWINGS

These and other features, aspects, and advantages of the present invention will become better understood when the following detailed description is read with reference to the accompanying drawings in which like characters represent like parts throughout the drawings, wherein:

FIG. 1 is a top view of an embodiment of a tillage implement, including a staggered arrangement of ground engaging tools and a non-uniform arrangement of soil shaping disks;

FIG. 2 is a side view of the tillage implement shown in FIG. 1;

FIG. 3 is a detailed rear view of a section of the tillage implement shown in FIG. 1, including the staggered arrangement of ground engaging tools.

DETAILED DESCRIPTION

Figure 4:
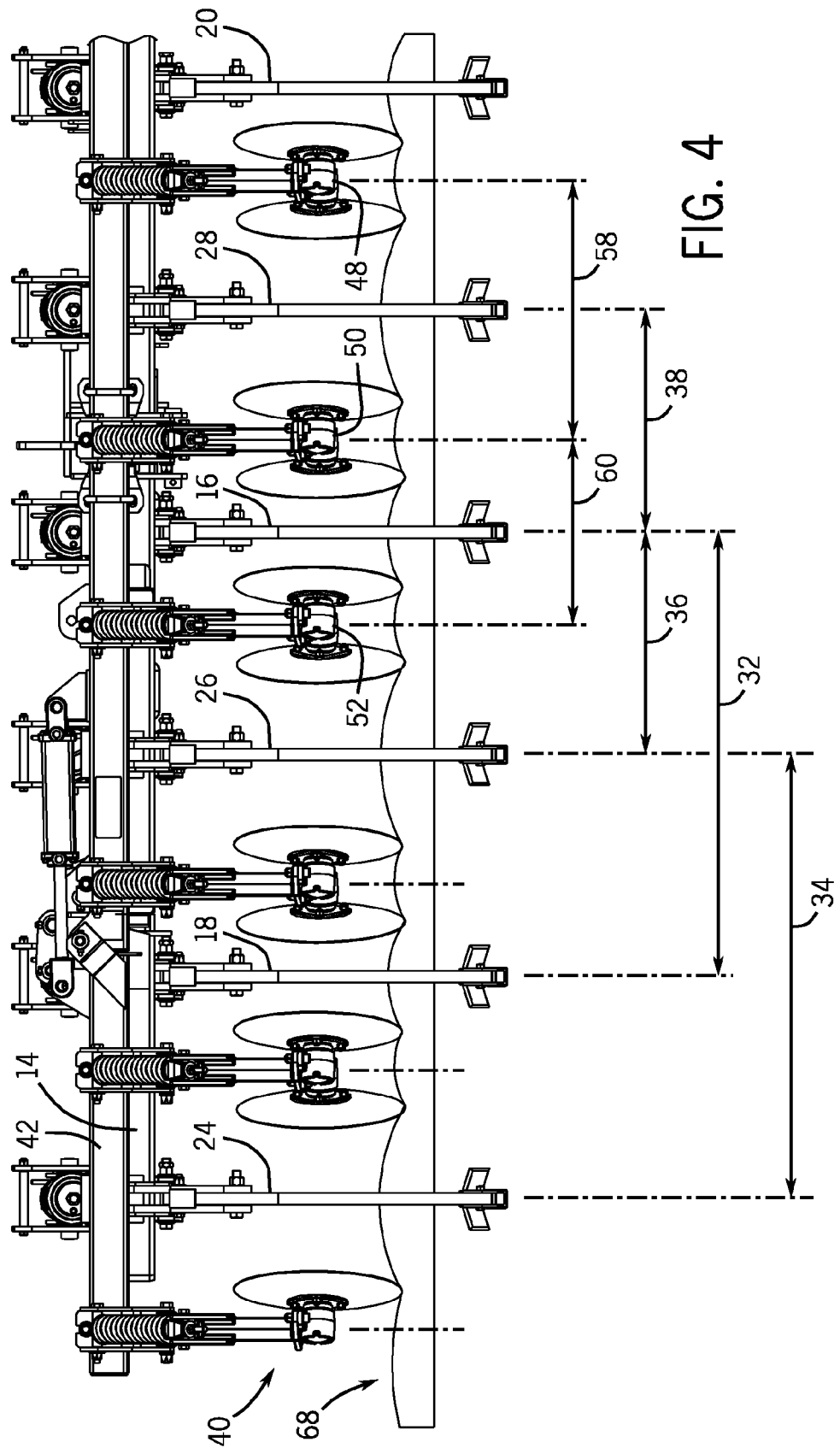
FIG. 4 is a detailed rear view of a section of the tillage implement shown in FIG. 1, including the staggered arrangement of ground engaging tools and the non-uniform arrangement of soil shaping disks.

FIG. 1 is a top view of an example of a tillage implement 10. The tillage implement 10 may be used to till a field to prepare the soil by plowing, ripping, or turning. A portion of soil residue, such as plant stalks and/or weeds, may be incorporated into the soil during the tilling process. Further, the soil may be loosened and aerated, which in turn facilitates deeper penetration of roots. The tilling process may also help in the growth of microorganisms present in the soil and thus, maintain the fertility of the soil. As depicted, the tillage implement 10 includes a first row of ground engaging tools 12. The first row of ground engaging tools 12 may be coupled to a frame 14, which supports tools, wheels, and other components of the tillage implement 10. The frame 14 may be formed of a durable strong material, such as steel. The first row of ground engaging tools 12 includes a center tool 16, as well as lateral or side tools 18 and 20. As depicted, the center tool 16 may be positioned forward of the side tools 18 and 20. Specifically, the center tool may be forward of the side tools 18 and 20 (i.e., in a direction the tillage implement 10 is towed). Accordingly, the center tool 16 may engage a region of soil prior to the ground engaging tools of side tools 18 and 20 as the tillage implement 10 is pulled across a field. The lateral spacing between the tools 16, 18 and 20 is generally uniform. Further, each tool assembly of the first row of ground engaging tools 12 may include a shank, plow, chisel, hoe opener, harrow tine or any combination thereof, or indeed any desired ground engaging tool.

In another embodiment, the center tool 16 may be aligned with side tools 18 and 20. For example, the entire set of first row tools 12, including tools 16, 18 and 20, may be aligned in a configuration where the frame 14 includes a single first row tool bar supporting and coupled to each of the tools. In the depicted embodiment, a second row of ground engaging tools 22 may be located behind the first row of ground engaging tools 12. Each of the tools is coupled to a tool bar of the frame 14 and is therefore aligned with the others. Accordingly, tools 24, 26, 28, and 30 are located behind the first row of ground engaging tools 12. Tools 22 of the second row are also uniformly spaced apart a distance 32. The uniform spacing of distance 32 enables the tools of the second row 22 to avoid a buildup of soil and crop residue on the tools 24, 26, 28, and 30. For example, in an embodiment where the tools include shanks and are spaced relatively close together, as the tillage implement 10 is drawn across a field soil residue, such as plant stalks and other crop residue, may be caught on the shanks and in spaces between them. In contrast, in the depicted embodiment, the distance 32 between the uniformly spaced second row of ground engaging tools 22 reduces a buildup of soil and crop residue.

Similarly, the first row of ground engaging tools 12 may be uniformly spaced a distance 34 from one another. As such, the positioning of the tools in the first row of ground engaging tools 12 provides a reduced buildup of soil and crop residue as the tillage implement 10 is towed across a field. Further, the distances 32 and 34 may be equal, meaning the lateral spacing between the first and second rows 12 and 22, respectively, is also uniform. For example, each of the tools in the first row of ground engaging tools 12 may be centered in the space between each pair of tools 22 of the second row. The distance between the tools 28 and the first row center tool 16 is indicated by the distance 38. Further, a lateral distance between tool 26 and center tool 16 is represented by a distance 36. As may be appreciated, the distances 32, 34, 36, and 38 may be measured between center lines of the respective tools. As such, the spacing of the first row of ground engaging tools 12 may be described as centered on the second row of ground engaging tools 22, and vice versa. The distances 36 and 38 may also be equal; meaning that the center tool 16 of the first row is centered between second row tools 26 and 28. Similarly, the side tool 20 of the first row is centered between second row tools 28 and 30. The first row side tool 18 is also centered between second row tools 24 and 26.

As depicted, the arrangement of rows 12 and 22 of ground engaging tools is configured to till the soil using ground engaging tools, such as shanks, plows or openers, thereby conditioning the field by breaking up compaction and mixing residue on the surface. The tools may also create valleys and berms in the soil. As the ground engaging tool rows 12 and 22 create such valleys and berms, the arrangement and spacing of the tools provides a reduced buildup of soil and crop residue on the tool components, improving the tilling operation of the implement 10. Further, the depicted arrangement of the first row 12 and second row 22 of ground engaging tools may be described as a staggered arrangement. In addition the arrangement of the implement may be described as an alternating lateral arrangement of ground engaging tools in rows 12 and 22. The arrangement of the second row of ground engaging tools 22 allows the tools to engage the soil and fill a portion of soil valleys created by the first row of ground engaging tools 12. Further, the second row of ground engaging tools 22 may create a second set of valleys, which may be larger than the partially filled first set of valleys. Accordingly, as discussed in detail below, an uneven level of soil, including alternating large and small valleys, may be produced by the first and second rows, 12 and 22, respectively.

In addition, a row of soil level disks 40 is disposed behind the second row of ground engaging tools 22. The soil shaping disks 40 are each coupled to a tool bar 42 that extends from the frame 14. As depicted, the row of soil shaping disks 40 includes a plurality of disk assemblies disposed at different locations along the tool bar 42. The arrangement and spacing of the individual disk assemblies along the tool bar 42 improves a shape of the soil surface to improve levelness, leading to reduced compaction and improved germination. As shown, the row of soil shaping disks 40 includes disk assemblies 44, 46, 48, 50, and 52. In addition, the disk assemblies located on the ends of the tool bar 42, including disk assembly 44, includes a single disk. The disk assembly 44 includes a single disk coupled to a bracket, wherein the disk is angled to direct soil to a soil region that has been shaped by the first row of ground engaging tools 12 and the second row of ground engaging tools 22. Further, disk assemblies 46, 48, 50, and 52 each include a pair of disks. The disk assemblies 46, 48, 50, and 52 may also include a bracket for mounting to the tool bar 42, which also provides angled positioning of the disks. The disks of assemblies 44, 46, 48, 50, and 52 may be concave or straight and may include fluted or straight edges depending on crop and field conditions. As depicted, the disks included in soil shaping disk row 40 are concave with straight edges, wherein the disks of each of the adjacent disk assemblies have working surfaces that face one another. For example, the concave disks of disk assemblies 44 and 46 include concave working surfaces that face one another, and are thereby configured to direct soil into a valley created by the ground engaging tool 30.

In addition, the row of soil shaping disks 40 includes disk assemblies that are non-uniformly spaced along the tool bar 42. For example, the disk assembly 44 may be located a distance 54 from the disk assembly 46. Further, the disk assembly 46 may be positioned a distance 56 from the disk assembly 48. The distance 54 may be greater than the distance 56. This arrangement of the row of soil shaping disks 40, using the spacing of distances 54 and 56, provides a non-uniform spacing between the disk assemblies 44, 46, and 48. Similarly, the disk assembly 48 is spaced a distance 58 from the disk assembly 50. Disk assembly 50 is positioned a distance 60, greater than distance 58, from disk assembly 52. Again, the spacing provided by distances 58 and 60 may be described as non-uniform spacing. As depicted, distances 54 and 58 may be equal and generally greater than equal distances 56 and 60. As shown by spacing distances 54, 56, 58, and 60, each of the disk assemblies in the row of soil shaping disks 40 are positioned in a non-uniform spacing arrangement. The non-uniform spacing may be repeated or periodic as depicted with disk assemblies 44, 46, 48, 50, and 52.

In addition, the non-uniform spacing arrangement of the row of soil shaping disks 40 produces a uniform soil output from the tillage implement 10. For example, a valley created by the side tool 20 of first row ground engaging tool 12 may be partially filled in by the tools 28 and 30 of second row of ground engaging tool 22. The second row of ground engaging tools 22 may also create valleys, which are larger than the partially filled in valleys created by the tools 20 of first row of ground engaging tools 12. Accordingly, the spacing 54 between soil shaping disks 44 and 46 is configured to direct a greater portion of soil into the larger valley created by the tool 30 of the second row 22 as compared to the smaller valley created by the side tool 20 of the first row 12. Specifically, the spacing 56 between disk assemblies 46 and 48 may move a relatively lesser portion of soil into the smaller valley, which has been partially filled in by the second row of ground engaging tools 22. The resulting output is a uniform soil region created by the non-uniformly spaced row of soil shaping disks 40. As such, the non-uniform spacing of the row of soil shaping disks 40 enables a greater spacing 32 and 34 between the first and second rows of ground engaging tools, 12 and 22, respectively. The greater spacings 32 and 34 provide reduced soil residue buildup on ground engaging tools due to the increased distance between tools (e.g., a reduced tendency for debris to be caught by the tools, and an increased likelihood that the debris will be channeled between the tools). Moreover, the arrangement reduces soil compaction by improving the uniformity of the soil surface while reducing the need for soil treatment by additional implements after the tillage implement 10 has passed over the field. Moreover, the uniform soil output ensures uniform moisture distribution in the soil and germination of crops. The depicted embodiment of tillage implement 10 also includes a first row of disk blades 62 and a second row of disk blades 64, wherein the disk blades are utilized to break up soil residue in a soil region prior to engaging the ground engaging tool rows 12 and 22. In other embodiments, the tillage implement 10 may not include disk blade rows 62 and 64. For example, a soil residue may be broken up by ground engaging tool rows 12 and 22. In the depicted embodiment, soil residue, including plant stalks, may be broken up by the disk rows 62 and 64 prior to encountering the ground engaging tool rows, 12 and 22. Further, the tools are configured to engage the ground in the ground engaging tool rows 12 and 22 may include shanks and plows.

FIG. 2 is a side view of an exemplary tillage implement 10, as shown in FIG. 1. The tillage implement 10 includes a coupling mechanism, such as a hitch, that is used to couple the implement to a towing vehicle, such as a tractor. The hitch assembly may be coupled to the frame 14 which supports wheels, ground engaging tools, and other components of the tillage implement 10. As depicted, the tillage implement 10 includes disk blade rows 62 and 64 located in front of the first row of ground engaging tools 12. In the illustrated embodiment, the first row of ground engaging tools 12 includes center tool 16, which is located forward of the side tools 18 and 20. The second row of ground engaging tools 22 is located behind the first row of ground engaging tools 12. In the illustrated embodiment, the rows 12 and 22 of ground engaging tools are positioned to till a field at a depth 66. Accordingly, the depth 66 and arrangement of the tools included in rows 12 and 22 may create valleys and berms which may be smoothed out and leveled off by the non-uniform spaced row of soil shaping disks 40. The non-uniform spacing of the soil shaping disk row 40 provides an arrangement to create a substantially uniform soil surface output, thereby improving levelness, leading to reduced compaction and improved moisture distribution. Further, the soil shaping disk row 40 enables an arrangement of ground engaging tools in rows 12 and 22 that reduces buildup of soil and crop residue on the implement, improving the tilling operation.

FIG. 3 is a rear view of a section of an example of the tillage implement 10, as shown in FIG. 1. As depicted, the view includes a side section of the frame 14 and the ground engaging tools from rows 12 and 22 coupled to the portion of the frame 14. As depicted, a soil region 68 is shaped by the ground engaging tools 16, 18, 20, 24, 26, and 28. The shanks and plows coupled to the ground engaging tools form large valleys 70 and small valleys 72 in the soil 68. As previously discussed, the valleys 72 created by first row of ground engaging tools 16, 18, and 20 are actually the same size as depicted valleys 70 prior to being partially filled in with soil as the second row of ground engaging tools 22 displace soil from the valleys 70 which reduces the size of valleys 72. Accordingly, after a soil shaping process by the first row of ground engaging tools 12 and second row of ground engaging tools 22, the soil 68 may be described as a non-uniform soil output, illustrated in part by soil region 68 of FIG. 3. The non-uniform soil output is then an input to the non-uniform row of soil shaping disks 40. The non-uniform row of soil shaping disks 40 directs soil to create a uniform soil output that is substantially uniform for improved irrigation and soil properties for seeding.

FIG. 4 is a rear view of a section of an exemplary tillage implement 10, including a section of the frame 14 and the ground engaging tools and soil shaping disks coupled to the implement. As depicted, non-uniform spacing of the row of soil shaping disks 40 may shape the soil surface to produce a uniform soil output from the tillage implement 10. The arrangement provides spacing between ground engaging tools on rows 12 and 22 to reduce soil residue buildup while producing a uniform soil output to improve the seed bed. In the embodiment, the space 60 between soil shaping disk assemblies 50 and 52 is less than a distance 58 between soil shaping disk assemblies 48 and 50. As previously discussed, the increased spacing 58 is configured to fill the larger valleys 72 created by the second row of ground engaging tools 22, including ground engaging tool 28. Further, while the uniform spacing illustrated by distances 32, 34, 36, and 38 may result in improved tillage, improved residue removal, and reduced residue buildup on the tillage implement 10. The staggered arrangement of the ground engaging tools produces a non-uniform soil region that is uniformly shaped by the non-uniform soil shaping disks 40. The soil 68 after treatment by the components of the tillage implement 10 may experience an improved and uniform moisture distribution, a level or uniform seed bed, and reduced soil compaction to improve crop growth in the field. Additionally, the non-uniform soil shaping disks reduces or eliminates the number of passes needed to prepare the soil for feeding.

Thus, in the arrangements discussed above, at least a first row of ground engaging tools is provided, with adjacent tools being spaced a first distance apart from one another. A second row of ground engaging tools is disposed behind the first row of ground engaging tools, adjacent tools of the second row of ground engaging tools being spaced a second distance apart from one another. At least one row of soil shaping disks is disposed behind the second row of ground engaging tools. Adjacent soil shaping disks are spaced by a non-uniform distance. The distance between adjacent soil shaping disks is greater or lesser depending upon whether the space between the adjacent soil shaping disks is behind a tool of the first row or a tool of the second row. It should be noted that the soil shaping disks may be in a single row or in more than one row. In the latter case, the term "adjacent soil shaping disks" means disks that are in adjacent lateral positions, whether in the same row or not. That is, a first disk in an adjacent pair may be in one row of disks, while the second disk in the adjacent pair may be in a row of disks in front of or behind that row.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A ground engaging agricultural implement, comprising:
at least a first row of ground engaging tools, adjacent tools being spaced a first distance apart from one another;
a second row of ground engaging tools disposed behind the first row of ground engaging tools, adjacent tools of the second row of ground engaging tools being spaced a second distance apart from one another, the second row of ground engaging tools positioned behind and between the ground engaging tools of the first row; and
at least one row of soil shaping disks disposed behind the second row of ground engaging tools, wherein a pair of soil spacing disks are provided for each tool of first and second rows, each pair of soils shaping disks located behind and centered on one tool from the first or second row, such that the spacing between each pair of soil shaping disks centered on each tool of the second row of ground engaging tools is a third distance and a spacing between each pair of soil shaping disks centered on each tool of the first row of ground engaging tools is a fourth distance, and the third distance is greater than the fourth distance, wherein each pair of soil shaping disks behind each tool of the second row moves more soil than each pair of soil shaping disks behind each tool of the first row, so that the soil immediately after each pair of soil shaping disks has a substantially equal configuration relative to each other.

2. The implement of claim 1, wherein each ground engaging tool of the second row is in a location that generally bisects the first distance between a pair of ground engaging tools of the first row.

3. The implement of claim 2, wherein the first distance is equal to the second distance.

4. The implement of claim 3, wherein an average of the third and fourth distances is approximately equal to a lateral offset between a first ground engaging tool on the first row and a second ground engaging tool on the second row.

5. The implement of claim 1, comprising at least one row of disk blades disposed in front of the first row of ground engaging tools.

6. The implement of claim 1, wherein the first and second distances are each about 46 to 50 inches.

7. The implement of claim 6, wherein the third distance is about 27 to 29 inches and the fourth distance is about 19 to 21 inches.

* * * * *